(12) United States Patent
Hoppe et al.

(10) Patent No.: US 6,364,582 B1
(45) Date of Patent: Apr. 2, 2002

(54) MACHINE TOOL WITH A WORKING AREA COVER

(75) Inventors: Gerd Hoppe, Habichtswald; Reinhold Seitz, Hopferau; Horst Hartmann, Gerlingen, all of (DE)

(73) Assignee: Deckel Maho GmbH, Pfronten (DE)

( * ) Notice: Subject to any disclaimer, the term of this patent is extended or adjusted under 35 U.S.C. 154(b) by 0 days.

(21) Appl. No.: 09/552,464

(22) Filed: Apr. 18, 2000

(30) Foreign Application Priority Data

Apr. 22, 1999 (DE) .......................................... 199 18 359

(51) Int. Cl.⁷ .............................................. B23Q 11/08
(52) U.S. Cl. ...................... 409/134; 74/608; 144/251.2; 408/241 G; 408/234; 409/235; 451/455
(58) Field of Search ............................... 74/608; 483/3; 409/134, 137, 235; 408/241 G, 234; 451/451, 455; 82/117, 173; 144/251.1, 251.2

(56) References Cited

U.S. PATENT DOCUMENTS

| | | | |
|---|---|---|---|
| 2,714,926 A | * 8/1955 | Nichta | .......................... 74/608 |
| 2,867,064 A | * 1/1959 | Hermansson | ................ 451/455 |
| 3,355,799 A | * 12/1967 | Daugherty | ...................... 483/3 |
| 5,342,156 A | 8/1994 | Baba | .......................... 409/134 |
| 5,423,359 A | * 6/1995 | Aigner | ..................... 144/251.2 |
| 5,509,301 A | * 4/1996 | Takano et al. | ................ 74/608 |
| 5,992,276 A | * 11/1999 | Sullivan | ..................... 409/134 |

FOREIGN PATENT DOCUMENTS

| | | |
|---|---|---|
| DE | 130 770 | 5/1978 |
| DE | 92 02 074.7 | 6/1992 |
| DE | 197 36 252 | 3/1999 |
| EP | 0 331 178 | 9/1989 |
| EP | 0 551 186 | 7/1993 |

* cited by examiner

*Primary Examiner*—Daniel W. Howell
(74) *Attorney, Agent, or Firm*—The Maxham Firm

(57) ABSTRACT

A machine tool with a working area cover provided with at least one door for allowing access to the working area of the machine tool. For providing an enhanced and simplified access to the working area without interfering protrusions or edges the door is a round door turnable about a vertical axis.

15 Claims, 3 Drawing Sheets

MACHINE TOOL WITH A WORKING AREA COVER

BACKGROUND OF THE INVENTION

1. Field of the Invention

The invention relates generally to a machine tool with a working area cover including at least one door for allowing access to a working area of the machine tool.

2. Discussion of the Prior Art

In conventional machine tools having a working area cover, the doors are generally formed as rectilinearly shiftable flat doors. To provide sufficiently large access to the working area of the machine tool, often two diagonally arranged and separately operable sliding doors are provided which laterally protrude over the machine stand by a considerable amount in their opened positions and may cause interference with the operator. In addition, sealing problems occur in the area of the linings of the two sliding doors in their closed positions and special precautions have to be taken to prevent dripping of the cooling agent from the doors which are laterally protruding in the opened position. Furthermore, relatively complicated sliding guides are required for such sliding doors on the bottom edge as well as on the upper edge. One would prefer a machine tool with a working area cover that provides enhanced and simplified access to the working area without interfering protrusions or edges.

SUMMARY OF THE INVENTION

According to the present invention, the door of a machine tool of the above mentioned type is a round door turnable about a vertical axis. One advantage of the present invention is that the outer dimensions of the machine tool remain unchanged even with the door fully opened. Further, with the door in the opened state, there are no laterally protruding sections of the door by which access may be hindered and motion about the machine might be limited. With only one round door that can be turned to the side, access to the working area can be provided which would only be obtainable by two diagonally arranged sliding doors in conventional embodiments. In addition, the corner areas in conventional embodiments may be omitted which eliminates a dead space that can not be utilized for machining. This is particularly the case in machine tools provided with turn tables. The working area cover can be optimally located in a potential interference area of a turn table, whereby space economy may be achieved. For example, the round door may be formed in the shape of a cylinder jacket segment having a round outer wall and an upper cover surface. Thus, a very stable and stiff door construction is obtainable, whereby the sealing and guidance are also simplified.

One constructively simple and cost effective guidance of the round door may be constructed by making the round door turnable about an upper turning joint and slidable on a lower round guide. In this way, a complicated sliding guide on the upper side of the door may be omitted.

In an embodiment which simplifies the removal of chips, the lower round guide may, for example, be disposed on a semicircular bottom pan which is either integrally formed with the machine stand or mounted on the stand. The semicircular bottom pan contains no interfering corners or protrusions at which chips may accumulate. The bottom pan has a bottom surface obliquely inclined toward a recess such that the machining chips may be guided toward the recess. In the recess, a conveyor worm, for example, may be formed for removing the chips through a chip removing channel.

For protecting the round guide from contamination by the machining chips during machining, the round door has a lower cover surface extending obliquely inward over the round guide. Thereby the complete curved guide may be covered when the door is closed. Chips or the like produced during the machining process may slide along the oblique end surface and fall into the bottom pan from where they may be removed by the conveyor worm.

Observation windows may be formed in the round door for visually monitoring the machining process. Since the observation windows are often intensively sprayed with cooling agents from the inside during the machining process and visual contact with the tool is thereby obscured, at least one rotating pane for tossing off the coolant-lubricant or the chips may be provided. Thereby, visual contact to the machining process may be ensured in at least one small section of the round door even in case of an intense use of coolant-lubricants. Such a rotating pane may be disposed in the round door, for example, within one observation window, or outside of the observation window at the side wall. The rotating pane may, however, also be provided in another section of the working area cover.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
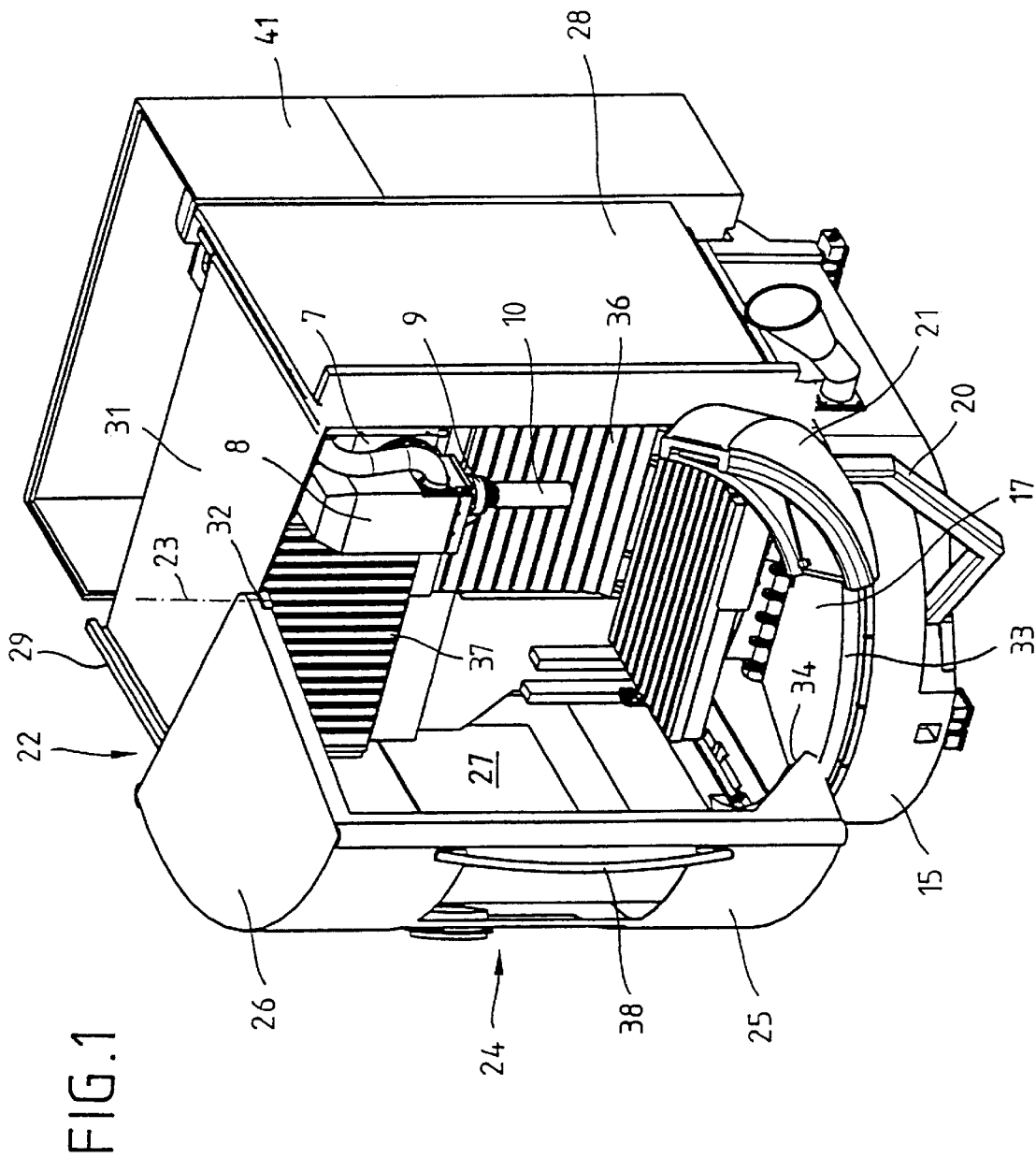
FIG. 1 is a perspective view of a machine tool including a working area cover with the round door opened.

The universal milling, drilling, and boring machine shown in the figures comprises a machine bed 1 (FIG. 3) on which a stand 2 is disposed. As can be seen from FIG. 3, a pair of 5 horizontal guide rails 3 and 4 are mounted on the upper side of stand 2. A slide 5, movable along an x-axis via a motor-driven spindle 6, is disposed on guiding rails 3 and 4. A spindle head 7, shown in FIG. 1, is mounted on slide 5. The spindle head is movable along a y-axis by means of a motor (not shown). Milling head 8 is rotatably attached to spindle head 7. In the milling head motor-driven work spindle 9 is borne for receiving milling and drilling tools 10 or tool adapters, for example.

On the front side of stand 2, two vertical guiding rails 11 and 12 (FIG. 3) are disposed along which console 13, including workpiece table 14, is guided so as to be movable along a z-axis via motor-driven spindle 35. Machine bed 1 has a semicircular front part 15 that provides a bottom pan below work table 14 and console 13. The semicircular front part 15 has a bottom surface 17 obliquely inclined in the direction of recess 16. Within recess 16, a motor-driven conveyer worm 18 is disposed for removing the machining chips through chip removing channel 19. Also on semicircular front part 15 is swing arm 20 for operating panel 21 which is hinged so as to be laterally shiftable.

Figure 2:
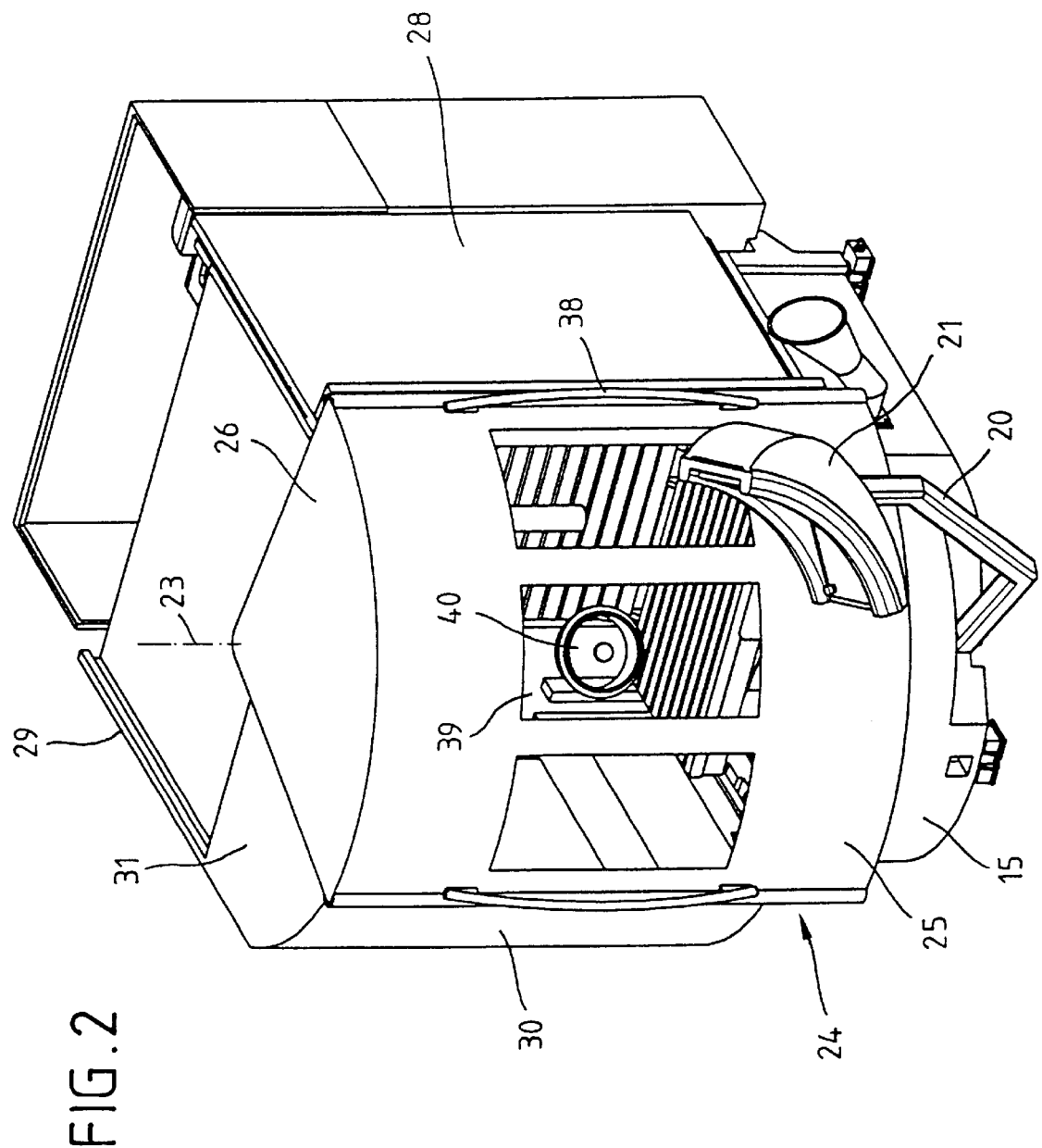
FIG. 2 is a perspective view of the machine tool of FIG. 1 including a working area cover with the round door closed.

As may be seen from FIGS. 1 and 2, the machine tool includes working area cover 22 for protecting the surroundings from the chips generated during the machining process or from the coolant-lubricants used in the machining process. The working area cover is formed as a protective cabin having round door 24 turnable about vertical axis 23. The round door, having the shape of a cylinder jacket segment in the illustrated embodiment, includes bent side wall 25 and cover surface 26 formed as a segment of a circle. In the present case, round door 24 has the segment of a quarter circle. Side wall 25 and cover surface 26 are connected to each other. In the embodiment according to FIGS. 1 and 2, round door 24 is formed so that it covers working area or space 27 of the universal milling, drilling, and boring machine on the right outer side and the front side in its closed position and allows access from the front and from the right side in its fully opened position. The fixed portions of the protective cabin include two parallel side walls 28, 29 and rounded face wall part 30 illustrated in FIG. 2. Side walls 28, 29 and face wall part 30 are connected by an upper cover plate 31. The front section of the working area of the machine tool not covered by closed round door 24 is closed by rounded wall part 30. The fixed portions of the protective cabin may be fixed to machine bed 1 or to stand 2, among others.

As specifically illustrated in FIG. 1, round door 24 is hinged to an upper turning joint 32 in cover plate 31 formed as a trunnion, for example, so as to be turnable about vertical axis 23. On the bottom side, the round door is slidably guided in arcuate or round guide 33, such as a guide rail, disposed on front part 15. The combination of upper turning joint 32 and lower curved guide 33 is inexpensive and provides stable guidance. Due to the stiff formation of round door 24 and the stable guidance, the sealing, for example, at the abutting edges of the round door, may also be simplified. Round door 24 is provided with cover surface 34 obliquely inclined toward the bottom pan on its bottom side. This cover surface overlaps round guide 33 when the door is closed. As a result, the chips produced during the machining process will slide along cover surface 34 to the obliquely inclined bottom surface 17 of front part 15. In this way, guidance 33 is protected from contamination.

Figure 3:
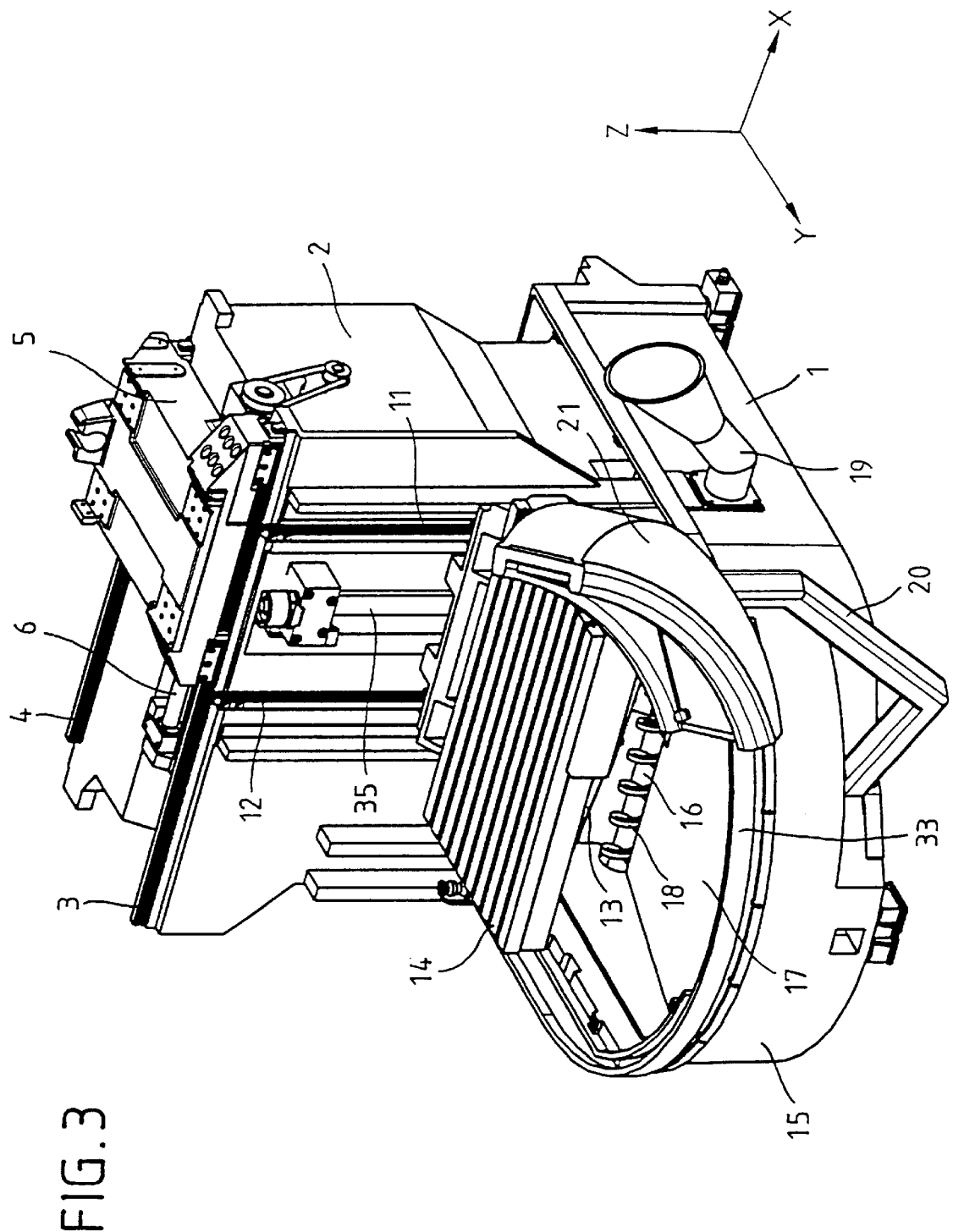
FIG. 3 is a perspective view of the lower construction of the machine tool of FIGS. 1 and 2 without the working area cover as well as protective covers for the guide rails.

Work spindle 35, shown in FIG. 3, as well as guide rails 3, 11, and 12 are, for example, covered by expansion bellows 36 and 37 or the like.

In the area of the two corner edges, respectively, of round door 24, curved hand grip 38 for opening and closing the door is attached. To allow for the observation of working area 27 during the machining process, round door 24 is provided with three separate observation windows 39 in the embodiment illustrated. According to FIG. 2, observation element 40 comprising a rotating pane for tossing off coolant-lubricant and chips is disposed in central observation window 39. The observation element may also be provided with a wiper element circulating on the inside for removing the chips or the coolant-lubricant splashing onto the pane. In this way, an operator may visually observe the machining process even when the observation windows are intensely sprayed with the coolant-lubricant from the inside and thus otherwise allow no visual contact to the machining position.

Detachable cover 41 enclosing the rear section of the machine tool may also be provided.

The invention is not limited to the embodiment described in detail and illustrated in the drawing. For example, the concept of the invention may not only be applied to universal milling, drilling, and boring machines, but also to other machine tools. Also, a plurality of round doors being, for example, concentrically shiftable into each other, may be provided, if a larger access area is required or such a construction is efficacious due to the prevailing geometric conditions.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A working area cover for a machine tool comprising:

at least one round door turnable about a vertical axis wherein access is provided to the working area of the machine tool.

2. The cover as defined in claim 1, wherein the at least one round door comprises a curved side wall and an upper cover surface.

3. The cover as defined in claim 1, wherein the at least one round door is formed in the shape of a cylinder jacket segment.

4. The cover as defined in claim 1, wherein the at least one round door is turnable about an upper turning joint and slidably guided on a lower curved guidance.

5. The cover as defined in claim 4, wherein the lower curved guidance is disposed on a semicircular bottom pan below a work table of the machine tool.

6. The cover as defined in claim 5, wherein the semicircular bottom pan comprises a portion of a machine stand of the machine tool.

7. The cover as defined in claim 5, wherein the semicircular bottom pan comprises a bottom surface obliquely inclined in the direction of a recess.

8. The cover as defined in claim 7, wherein the recess has disposed therein a conveyer worm for removing the chips through a chip removing channel.

9. The cover as defined in claim 4, wherein the at least one round door comprises a lower cover surface obliquely inclined to the inside for covering the lower curved guidance.

10. The cover as defined in claim 1, further comprising parallel side walls and a curved face wall part wherein a protective cabin is formed.

11. The cover as defined in claim 1, wherein the at least one round door comprises at least one lateral door grip and at least one observation window.

12. The cover as defined in claim 1, wherein the at least one round door comprises at least one observation element.

13. The cover as defined in claim 12, wherein the at least one observation element comprises a rotating pane for tossing off coolant-lubricant and chips.

14. The cover as defined in claim 12, wherein the at least one observation element comprises a rotating wiper element for removing coolant-lubricant and chips.

15. The cover as defined in claim 1, further comprising at least a second round door turnable about the vertical axis of the at least one round door and concentrically shiftable into the at least one round door.

* * * * *